July 7, 1931.  F. H. DELLAREE  1,813,697
SCREW FEEDING MECHANISM
Filed Jan. 9, 1926  2 Sheets-Sheet 1
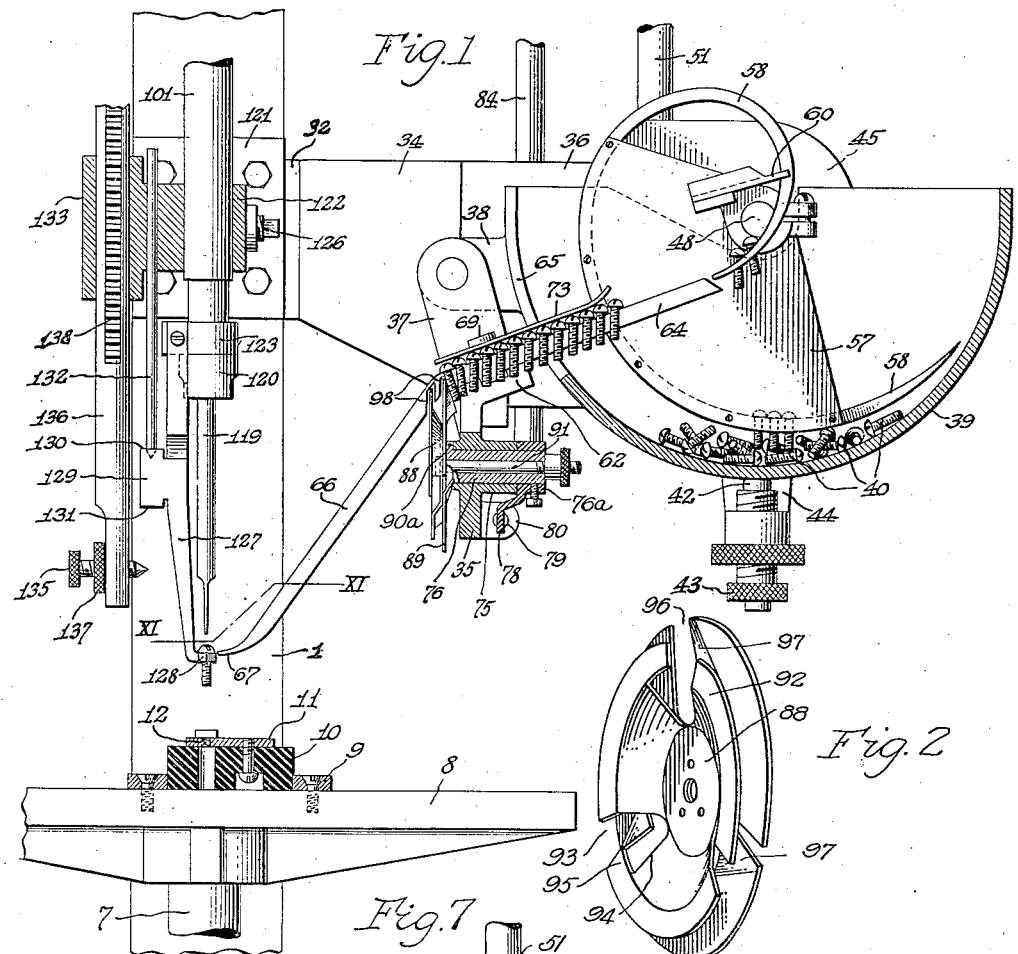
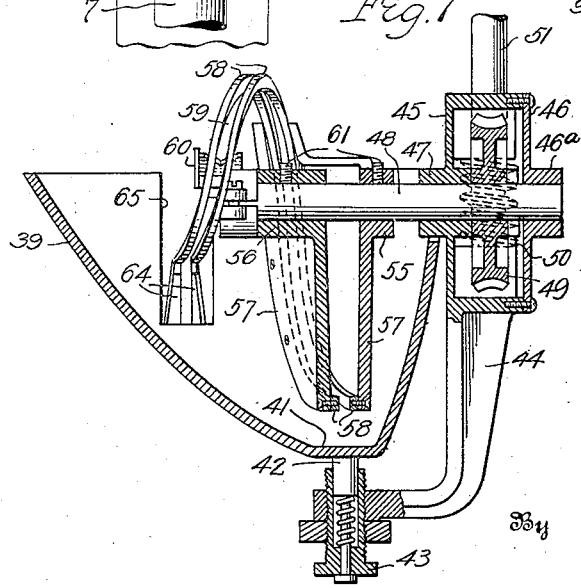
Inventor
Frank H. Dellaree,
By
Attorneys Inventor
Frank H. Dellaree
By
Attorneys Patented July 7, 1931

1,813,697

UNITED STATES PATENT OFFICE

FRANK H. DELLAREE, OF DETROIT, MICHIGAN, ASSIGNOR OF ONE-HALF TO ROY W. BAILEY, OF DETROIT, MICHIGAN

SCREW FEEDING MECHANISM

Application filed January 9, 1926. Serial No. 80,184.

This invention relates to a screw driving machine and has special reference to that type of machine which successively places screws in position relative to pieces of work for driving the screws into the work. Many electrical fixtures, boxes, machine parts and a large variety of articles require a large number of screws of various types and sizes. Considerable time and labor is required to mount these screws by hand and very often the screws are not fully tightened or driven "home", with the result that when such articles are shipped or used screws become loose and some of those which are already loose become entirely displaced, thus incurring delay and dissatisfaction incident to replacement of lost screws.

My invention, in its broadest aspect, involves a screw driving machine in which screws of various types and sizes may be expeditiously manipulated and positively driven home in a piece of work whereby the screws or parts held thereby cannot become accidentally displaced. The machine necessarily involves various devices for supplying screws to a screw driver and for driving the screws home without injury to the screws or the piece of work in which the screws are mounted. These devices are operatively organized into a durable and compact machine and the present application is concerned particularly with the feeding chute and escapement mechanism for releasing the screws to the screw driver at regular intervals.

The novel feeding chute and escapement mechanism is associated with the screw magazine and after the chute is adjusted for a predetermined size of screw and supplied with such screws from the magazine, the escapement mechanism is adapted to intermittently release screws, one at a time, so that the chute may place the screws in position for further operations by the machine. The escapement mechanism is constructed to take care of screws of various sizes and shapes and a series of escapement parts may form part of the equipment of each machine so that these escapement parts may be interchangeable to take care of minimum and maximum size of screws.

Reference will now be had to the drawings made from a machine which has been successively used, and in the drawings, Fig. 1 is an enlarged sectional view of a portion of the machine showing the screw magazine, the gathering instrumentality, the feed chute and a portion of the screw driving spindle relative to a piece of work;

Fig. 2 is a perspective view of a detached feeding device forming part of the escapement mechanism of the machine;

Fig. 7 is a vertical section of the screw gathering instrumentality, in planes at right angles to Figure 1.

Figure 3:
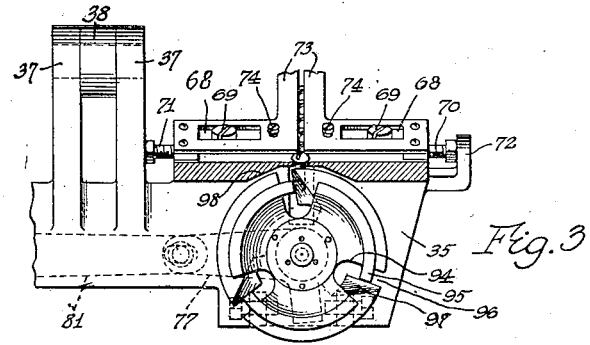
Fig. 3 is an elevation of the escapement mechanism retaining a screw in the feed chute, which is shown in cross section.

The reference numeral 1 denotes a tubular column or pedestal that might be mounted on a floor or other suitable support.

The column 1 supports the stem 7 of a work holder or table 8. On the table may be mounted a work positioning member 9 and as a sample of a small piece of work I show an insulator 10 provided with a metallic plate 11 having a screwthreaded opening 12 adapted to receive a screw.

The column 1 has a boss 32 and attached thereto is a bracket having arms 34, the latter being angular in plan or provided with a forwardly extending support 35 and a side support 36. The support 35 has upwardly extending lugs 37 and pivotally mounted between the upper ends of said lugs is a lug 38 carried by a screw magazine 39, which is substantially semi-cylindrical in longitudinal section with its curved walls converging to a bottom wall 41, said magazine walls causing screws 40 to accumulate on the bottom wall 41 to afford a constant supply for the gathering instrumentality. The bottom wall 41 of the magazine is engaged by a spring pressed plunger 42 mounted in an adjustable holder 43, carried by an angular arm 44 forming part of the support 36. The holder 43 may be adjusted so that the yieldable plunger 42 will properly support the magazine 39 relative to the gathering instrumentality and if necessary permit the bottom wall 41 of the magazine to yield should it be subjected to pressure incident to gathering screws from within the magazine.

The support 36 is formed to provide a gear housing 45 containing gearing (not shown) for driving a shaft 48 journaled in the magazine 39.

Figure 5:
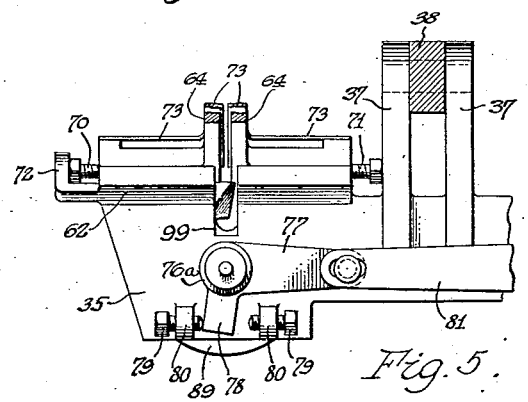
Fig. 5 is an elevation of the opposite side of the escapement mechanism from that shown in Figs. 3 and 4.

Adjustably mounted on the shaft 48, within the magazine 39, are the hub portions 55 and 56 of a screw gathering instrumentality and these hub portions are provided with helically or spirally shaped webs or plates 57 of generally decreasing radius from one end to the other and to the inner marginal edges of which are secured spiral or helical rails 58. The inner faces of the plates converge outwardly from the shaft 48 as shown in Figure 5. The rails 58 form a spiral slot 59 to receive the shanks of the screws 40 with the heads of the screws resting on the rails, said rails forming a spiral track that has a receiving end extending from the webs 57 towards the inner wall of the magazine 39, the ends of the rails at this receiving end being tapered, as best shown in Fig. 1, so that the screws may be scooped up with the heads of the screw resting on the rails and the screw shanks extending between the rails. Due to the spiral formation of the slot 59, the ends thereof are spaced apart in a direction substantially parallel to the shaft 48.

The inner end of the track is of convolute formation and is curved inwardly past the end of the shaft 48 to constitute a delivery end, the screws sliding around on the track as the gathering instrumentality is rotated. As it swings with a scooping action in proximity to the bottom of the magazine the webs 57 prevent the loose screws in the magazine from displacing those screws which have been gathered into the trough or channel formed by the webs, and for fear that screws might be discharged by the inner end of the track in other than proper position, a guard 60 is supported from the end of the shaft 48 with the configuration of said guard such as to straighten up any screw that is not properly supported by the track. This is essential where some screws may have large heads, washer heads or the like that would tend to support the screws other than in proper position for discharge from the gathering instrumentality. Just as screws will have various other kinds of heads, so the screws will be of various sizes, therefore the rails 58 of the spiral track are adjustable relative to each other by shifting the hub portions 55 and 56 on the shaft 48 and then fixing the hub portions relative to the shaft by set screws 61 or other fastening means.

The pick-up action may best be understood by reference to Figure 5 which shows that the plates 57 are spaced considerably nearer the leading ends thereof, and inasmuch as the plates diverge forwardly from the sectioned areas in Figure 5, the spacing at the leading ends is actually greater than shown in this figure. The prongs extending from the rails 58 may be disregarded, and it will be evident that between the plates is gathered a quantity of screws in an intermingled, disorderly or unarranged condition (since the spacing of the plates is greater than the width of the slot 59 which in turn is substantially equal to the diameter of the screws), in much the same manner as if a human hand were dipped into the magazine. The screws gravitate towards the restricted slot between the rails 58, and in so doing, assume the orderly and aligned condition shown in dotted lines in Figure 7.

The support 35 is in proximity to the magazine 39 and said support is formed with an inclined portion 62 longitudinally grooved to receive the tongues 63 of parallel adjustable feed rails 64 which have the upper ends thereof extending through a slot 65 into the magazine 39 with the receiving ends of the rails 64 adapted to receive screws 40 from the gathering instrumentality. The screws are delivered into the slot between the rails 64 with the heads of the screws resting on the rails and suspending the shanks of the screws, so that said screws may slide down the rails towards the support 35, where the sliding movement of the screws is arrested until the screws may be individually released or intermittently fed into the lower portion 66 of the feeding chute which is disposed at an obtuse angle relative to the receiving end of the chute, whereby a screw may rapidly descend after being released to a claw delivery end 67 of the feed chute.

The rails 64 are adjustable on the support 35 for the same purpose as the gathering rails 58 and the rails 64 are slotted, as at 68, to receive set screws 69 by which the rails 64 may be fixed to the support 35 after being adjusted relative to each other. This adjustment of the rails 64 to and from each other may be conveniently accomplished by set screws 70 and 71 mounted in the outer edges of the rails, the set screw 71 abutting one of the lugs 37 and the set screw 70 abutting an angular bracket 72, carried by the inclined portion 62 of the support 35.

To prevent vertical displacement of the screws 40 as they accumulate in the upper end of the feed chute and at the same time cause the heads of the screws to assume a proper position relative to the rails 64, there are resilient cover plates 73 mounted on the outer edges of the rails 64 and adapted to confront each other and overlie the heads of the screws 40. The confronting edges of the cover plates 73 may be sprung or adjusted relative to the rails 64 by set screws 74, thus providing clearance for screw heads of various sizes and shapes. The cover plates 73 are slotted to provide clearance for the set screws 69 and the upper ends of the cover plates are bent upwardly to afford an entrance for the screw heads when passing under the cover plates.

The support 35 is formed with a bearing 75 for the escapement mechanism and journaled in the bearing 75 is a rock shaft 76. Mounted on the inner end of this rock shaft is the hub portion 76a of a bell crank 77, the short arm 78 of which extends between adjustable stop screws 79 in lugs 80 carried by the support 35. The stop screws 79 constitute one of the adjustments for regulating the action of the escapement mechanism. The long arm of the bell crank 77 is pivotally connected to the slotted end of a crank 81 mounted on a rock shaft 82 journaled in the support 35. On the rock shaft 82 is another slotted crank 83 which is engaged by the pin end of an actuating rod 84 extending upwardly in parallelism with the column 1 and through the arm 33.

Mounted against the forward end of the rock shaft 76 is an escapement device composed of two disks 88 and 89 that are held in a defined relation by one or more dowel pins 90 extending into a head 90a of the rock shaft 76. The disks 88 and 89, which may be regarded as leaves because of their flaring from a common plane where fastened together by the pins 90, are also held relative to the shaft 76 by a nut equipped bolt 91 axially of the shaft.

Figure 4:
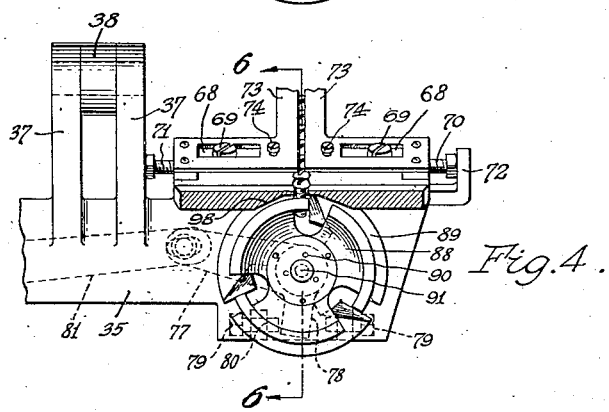
Fig. 4 is a similar view showing the screw about to be released from the feed chute.

The disks 88 and 89 which constitute the escapement device are best shown in Figs. 2, 3 and 4. The disk 88 has its central portion dished so as to provide a rim portion 92 having radial slots 93 communicating with openings 94 in the dished portion of the disk 88. The openings 94 are of greater area than the slots 93 and protruding portions 95 of the rim 92 perform an important function in connection with the escapement mechanism, as will presently appear.

The disk 89 is substantially flat and has its marginal portions provided with slots 96 and outstruck angularly disposed screw separating members 97. The slot 96 of the disk 89 substantially aline with the openings 94 of the disk 88 and may be considered as being arranged in sets with one set larger than the other to take care of screws of various sizes. Obviously the disks could be made very large so that there would be a large number of slots and openings for various sizes of screws, but instead of using extremely large disks, additional disks can be provided as equipment for the machine. The nut equipped bolt 91 will permit of the disks 88 and 89 being loosened relative to the rock shaft 76 and reset on the dowel pins 90 whereby a desired set of openings will be presented at the slot of the feed chute.

The lower face of the rails 64 of the feed chute are recessed, as at 98 to permit of the periphery of the escapement device being in close proximity to the feed chute, and the support 35 is slotted, as at 99 to provide clearance for screw shanks so that the screws may be controlled by the escapement device.

Figure 6:
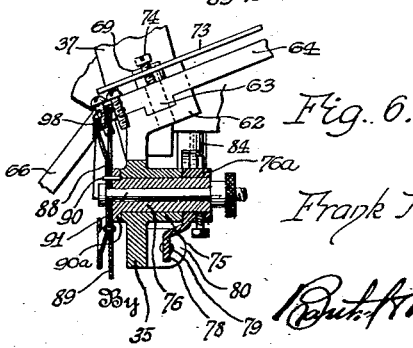
Fig. 6 is a longitudinal sectional view taken on the line 6—6 of Fig. 4.

By reference to Fig. 3, it will be noted that the escapement device is in position to hold back the gravity descending screws in the upper end of the feed chute, the lowermost screw having its shank engaging the marginal portion of the disk 89, at the screw separating member 97. As the escapement device is turned in a clockwise direction from that shown in Fig. 3 the device assumes a position shown in Fig. 4 where the lowermost screw has passed through the slot 96 of the disk 89 and engages the protruding portion 95 of the disk rim 92. Here the screw is held, as best shown in Fig. 6, and when the escapement device is turned in a counter clockwise direction the slot 93 of the disk 88 releases the lowermost screw and the screw separating member 97 is shifted between the lowermost screw and the following or adjacent screw, whereby the member 97 serves as a barrier to prevent the following screws from descending the actutely inclined end portion 66 of the feed chute.

The feeding of the screws is in timed relation to other operations of the machine and when adjustments are made in connection with the screw gathering instrumentality and the feed chute the escapement device may be changed in accordance with such adjustments. All of this can be quickly accomplished whereby shifting from one type or size of screw to another does not necessarily or materially decrease production.

Supported from the column 1 and geared to a suitable drive (not shown) is a spindle 101. The lower end of the spindle 101 carries a screw driver 119, detachably held relative to the lower spindle section by a cap 120.

Attached to the front side of the column 1 is a bracket 121 having a guide sleeve 122 for the spindle 101. Slidably mounted on the spindle 101, between the guide sleeve 122 and the cap 120 is a screw holding and positioning device, including a collar 123 and a set of depending resilient fingers 127 connected thereto and having the lower ends thereof extended in a lateral direction to provide screw gripping members 128. The resilient fingers 127 are formed with side extensions 129 having beveled shoulders 130 and 131. The beveled shoulders 130 are adapted to be engaged by a wedging finger opening rod 132 depending from an offset portion 133 of the guide sleeve 122, said rod being adjustably held in the offset portion 133 by a set screw (not shown). The beveled shoulders 131 of the fingers are adapted to be engaged by the beveled end of a wedging set screw 135 mounted in the lower end of a rod 136 slidable in the offset portion 133 of the guide sleeve 122. The set screw 135 may be secured in adjusted position by a thumb nut 137 and the rod 136 is adapted to be adjusted in the portion 133. The finger opening rods 136 and 132, the rod 124, and the spindle are disposed in parallelism and very close together, so that this portion of the machine may enter a very narrow and deep space for placing a screw. For instance, in the corner of a deep box, the bottom of a deep socket, and many places where a comparatively wide spindle would prohibit the manipulation of a screw.

Assuming that the magazine 39 has been loaded with screws and that the driving motor has been placed in operation by an attendant of the machine who manipulates the pieces of work on the table 8, power is transmitted to the shaft 48 of the magazine and the screws are gathered and delivered into the feed chute to be held in active positions by the feed chute and escapement mechanism. As soon as the upper portion of the feed chute is filled with screws the screw gathering instrumentality simply returns the screws to the magazine but whenever the feed chute will accommodate one or more screws the gathering instrumentality supplies the same. The escapement mechanism releases screws to the lower portion 66 of the feed chute at regular intervals in the manner already described in detail.

After the screw has sufficiently entered the opening 12 of the piece of work the fingers 127 encounter the finger opening screw 135 causing the screw gripping members 128 to be fully separated so that the spindle may be raised. The cap 120 will restore the collar 123 to its normal position, and the escapement mechanism will release the lowermost screw so that it may descend the acutely inclind portion 66 of the feed chute and be supported between the screw gripping members 128, which have closed after being released by the screw 137 and have encountered the rod 132 which properly places the fingers 127 for the reception of the screw.

It is thought that the operation and utility of the machine will be apparent without further description, but I desire to again call attention to the fact that screws cannot jam in the feed chute and are constantly supplied thereto during the operation of the machine; that a head of the screw cannot be injured by the screw driver, and that the adjustable parts of the machine can be easily and quickly set to take care of various kinds and sizes of screws that are to be handled. On account of the table 8 being adjustable, large and small pieces of work may be rapidly handled beneath the screw driver, which with adjacent parts can enter a narrow deep space for driving a screw. Since the magazine and feed chute may be used for supplying nails and the like to a driving instrumentality, I do not care to confine the use of this portion of my machine to a screw driving machine, and obviously structural changes may be made as fall within the scope of the appended claims.

What I claim is:—

1. In a screw driving machine wherein a feed chute is adapted to place screws in position to enter a piece of work, an escapement mechanism associated with said feed chute and adapted to intermittently release screws, said escapement mechanism comprising a set of detachable disks adapted to be oscillated, said disks having a configuration to receive the screw when turned in one direction and release the screw when turned in the opposite direction.

2. A screw driving machine as called for in claim 1, further characterized by said disks having a series of openings to receive screws with said openings varying in size to accommodate various kinds of screws.

3. In a screw driving machine, a screw magazine, a feed chute extending therein, a screw gathering instrumentality in said magazine adapted to deliver screws to said feed chute, and an escapement mechanism supported at said feed chute and adapted to be intermittently actuated to release screws from said feed chute, said escapement mechanism including oscillatory disks, with one of said disks having a configuration adapted to separate screws, and the other disk having a configuration adapted to temporarily retard a screw in said chute.

4. In a screw driving machine, a screw magazine, a feed chute extending therein, a screw gathering instrumentality in said magazine adapted to deliver screws to said feed chute, and an escapement mechanism supported at said feed chute and adapted to be intermittently actuated to release screws from said feed chute, said escapement mechanism including oscillatory leaves adapted alternately to intercept said track, with one of said leaves having a configuration adapted to separate screws, and the other leaf having a configuration adapted to temporarily retard a screw in said chute.

5. In a screw driving machine, a screw magazine, a feed chute extending therein, a screw gathering instrumentality in said magazine adapted to deliver screws to said feed chute, and an escapement mechanism supported at said feed chute and adapted to be intermittently actuated to release screws from said feed chute, said escapement mechanism including oscillatory leaves adapted alseparate screws, and the other leaf having a configuration adapted to temporarily retard a screw in said chute, the latter leaf being positioned nearer than the first named leaf to the discharge end of said chute.

In testimony whereof I affix my signature.

FRANK H. DELLAREE.